United States Patent
Okita et al.

(10) Patent No.: US 9,964,025 B2
(45) Date of Patent: May 8, 2018

(54) ENGINE AND MOTORCYCLE

(71) Applicant: SUZUKI MOTOR CORPORATION, Hamamatsu-shi, Shizuoka (JP)

(72) Inventors: Kazuhiro Okita, Hamamatsu (JP); Takaya Suzuki, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 96 days.

(21) Appl. No.: 15/331,367

(22) Filed: Oct. 21, 2016

(65) Prior Publication Data

US 2017/0114713 A1    Apr. 27, 2017

(30) Foreign Application Priority Data

Oct. 27, 2015 (JP) .................. 2015-210362

(51) Int. Cl.
| | |
|---|---|
| *F02B 37/02* | (2006.01) |
| *F01M 5/00* | (2006.01) |
| *F01P 3/18* | (2006.01) |
| *F01M 11/03* | (2006.01) |
| *F02B 61/02* | (2006.01) |

(52) U.S. Cl.
CPC ............ *F02B 37/02* (2013.01); *F01M 5/002* (2013.01); *F01M 11/03* (2013.01); *F01P 3/18* (2013.01); *F02B 61/02* (2013.01); *F01M 2011/033* (2013.01); *F01P 2050/16* (2013.01)

(58) Field of Classification Search
CPC ......... F02B 37/02; F02B 61/02; F01M 5/002; F01M 11/03; F01M 2011/033; F01P 3/18; F01P 2050/16

USPC ................................................ 60/605.1, 605.2
See application file for complete search history.

(56) References Cited

U.S. PATENT DOCUMENTS

| | | | | |
|---|---|---|---|---|
| 5,908,017 A * | 6/1999 | Kaneko | .................. | F02M 35/12 123/184.38 |
| 6,659,089 B2 * | 12/2003 | Gokan | .................. | B63B 35/731 123/559.1 |
| 6,904,885 B2 * | 6/2005 | Osband | .................... | F02B 75/22 123/190.1 |
| 2003/0017760 A1 * | 1/2003 | Gokan | .................... | B63H 21/14 440/39 |
| 2007/0199321 A1 * | 8/2007 | Miura | ................. | F02B 29/0462 60/599 |
| 2015/0113984 A1 | 4/2015 | Shibano et al. | ................. | 35/162 |

FOREIGN PATENT DOCUMENTS

| | | |
|---|---|---|
| JP | 60-240523 A | 11/1985 |
| JP | 60-240524 A | 11/1985 |
| JP | 2015-83429 A | 4/2015 |

* cited by examiner

*Primary Examiner* — Hoang Nguyen
(74) *Attorney, Agent, or Firm* — Stein IP, LLC

(57) ABSTRACT

There is provided an engine. An exhaust manifold is attached to an exhaust port of a cylinder head. A supercharger has a turbine housing accommodating therein a turbine configured to rotate by an exhaust air from the exhaust port. A balancer is disposed at a front side in a crank case. A radiator is disposed in front of the engine. The exhaust manifold and the turbine housing are integrally formed. The supercharger is disposed above the balancer. The radiator is disposed above the supercharger.

7 Claims, 3 Drawing Sheets

ENGINE AND MOTORCYCLE

CROSS-REFERENCE TO RELATED APPLICATIONS

The disclosure of Japanese Patent Application No. 2015-210362 filed on Oct. 27, 2015, including specification, drawings and claims is incorporated herein by reference in its entirety.

TECHNICAL FIELD

The disclosure relates to an engine having a supercharger and a motorcycle.

BACKGROUND

A motorcycle having a supercharger has been known which is configured to use an exhaust air of an engine as a driving source of the supercharger (for example, refer to Patent Documents 1 to 3). In a motorcycle disclosed in Patent Documents 1 and 3, an exhaust manifold is attached to an exhaust port formed on a cylinder head, and a supercharger (turbo charger) is attached to the exhaust manifold.

Patent Document 1: Japanese Patent Application Publication No. S60-240523A
Patent Document 2: Japanese Patent Application Publication No. S60-240524A
Patent Document 3: Japanese Patent Application Publication No. 2015-83429A The exhaust manifold that is to be attached to the exhaust port is formed by bending metallic pipes corresponding to the number of cylinders. A tip of the pipe is provided with a flange portion, and the supercharger is fixed to the flange portion by bolt fastening. In this case, it is necessary to secure a large radius when bending the pipe, so that an attachment position of the supercharger is limited. As a result, the engine is enlarged as a whole.

SUMMARY

It is therefore an object of the disclosure to provide an engine and a motorcycle, in which a supercharger can be disposed without enlarging the engine.

According to an aspect of the embodiments of the present invention, there is provided an engine comprising: an exhaust manifold attached to an exhaust port of a cylinder head; a supercharger having a turbine housing accommodating therein a turbine configured to rotate by an exhaust air from the exhaust port; a balancer disposed at a front side in a crank case; and a radiator disposed in front of the engine, wherein the exhaust manifold and the turbine housing are integrally formed, wherein the supercharger is disposed above the balancer, and wherein the radiator is disposed above the supercharger.

According to the above configuration, the exhaust manifold and the turbine housing are integrally formed, so that it is possible to design a shape of the exhaust manifold smaller, as compared to a configuration where a pipe is bent. For this reason, it is possible to dispose the supercharger near the engine-side. Also, as the shape of the exhaust manifold is made smaller, it is possible to dispose the radiator near the engine-side above the supercharger. By these configurations, it is possible to reduce an entire width of the engine in a front-rear direction even though the engine has the radiator. In this way, since it is possible to secure a degree of freedom as to the shapes of the exhaust manifold and the turbine housing, it is possible to dispose the supercharger without enlarging the engine, as compared to a configuration where the exhaust manifold and the turbine housing are separately formed. Also, the number of components is reduced, so that it is possible to simply perform a mounting operation.

In the engine, the radiator may be attached with an electric fan, and the electric fan may be disposed above the exhaust manifold. According to the above configuration, while reducing the width of the engine in the front-rear direction, it is possible to dispose the electric fan at a position spaced from the exhaust manifold that is to generate heat. For this reason, while securing a gap between the electric fan and the supercharger, it is possible to suppress a direct influence of heat from the supercharger on the electric fan.

In the engine, the radiator may be disposed above the exhaust manifold and below a cylinder head cover. According to the above configuration, it is possible to dispose the radiator in a limited space between the exhaust manifold and the cylinder head cover, so that it is possible to effectively utilize the space.

In the engine, an oil cooler and/or an oil filter may be disposed below the balancer. According to the above configuration, it is possible to effectively utilize a space below the balancer.

In the engine, the exhaust manifold may be connected above the turbine housing. According to the above configuration, it is possible to secure a space below the turbine housing.

In the engine, the exhaust manifold may be positioned at the rear of a front surface of the turbine housing. According to the above configuration, it is possible to reduce a protrusion amount of the exhaust manifold in the front-rear direction, so that it is possible to bring the entire supercharger close to the crank case-side. Therefore, it is possible to reduce the entire width of the engine in the front-rear direction.

Also, the motorcycle of the disclosure may have the above-described engine.

According to the disclosure, the exhaust manifold and the turbine housing are integrally formed and the supercharger is disposed near the crank case, so that it is possible to dispose the supercharger without enlarging the engine.

DETAILED DESCRIPTION OF THE EMBODIMENTS

Hereinafter, an illustrative embodiment of the disclosure will be described in detail with reference to the accompanying drawings. Meanwhile, in the below, an example where an engine of the disclosure is applied to a motorcycle will be described. However, the disclosure is not limited thereto. For example, the engine of the disclosure may also be applied to a motorcycle of other type, a three-wheeled motor vehicle of a buggy type, a four-wheeled motor vehicle, or the like. Also, regarding directions, a vehicle front side is denoted with an arrow FR, a vehicle rear side is denoted with an arrow RE, a vehicle left side is denoted with an arrow L, and a vehicle right side is denoted with an arrow R, respectively. Also, in the respective drawings, some configurations are omitted for convenience of explanations.

Figure 1:
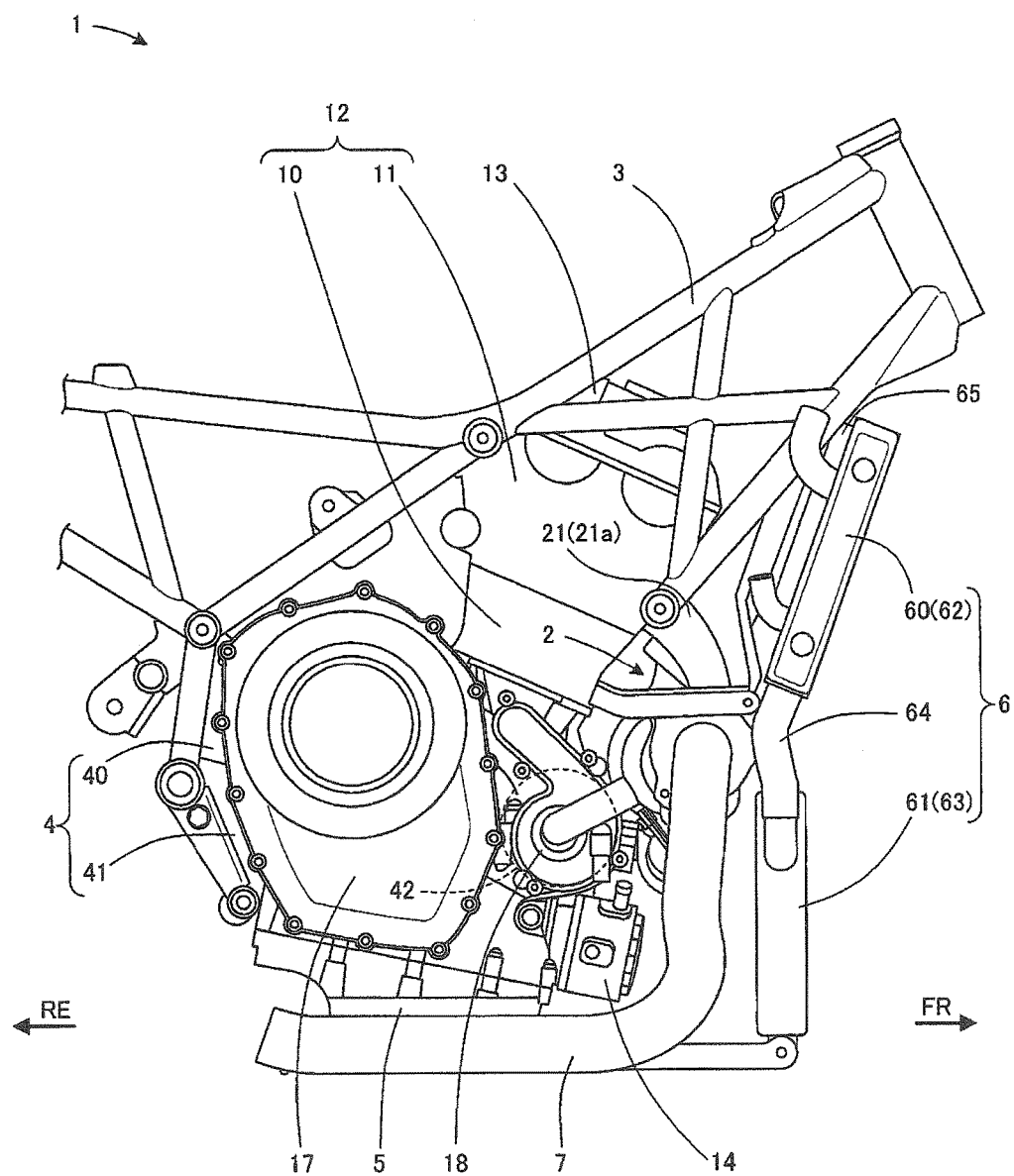
FIG. 1 is a side view depicting a schematic configuration around an engine of a motorcycle in accordance with an illustrative embodiment.
Figure 2:
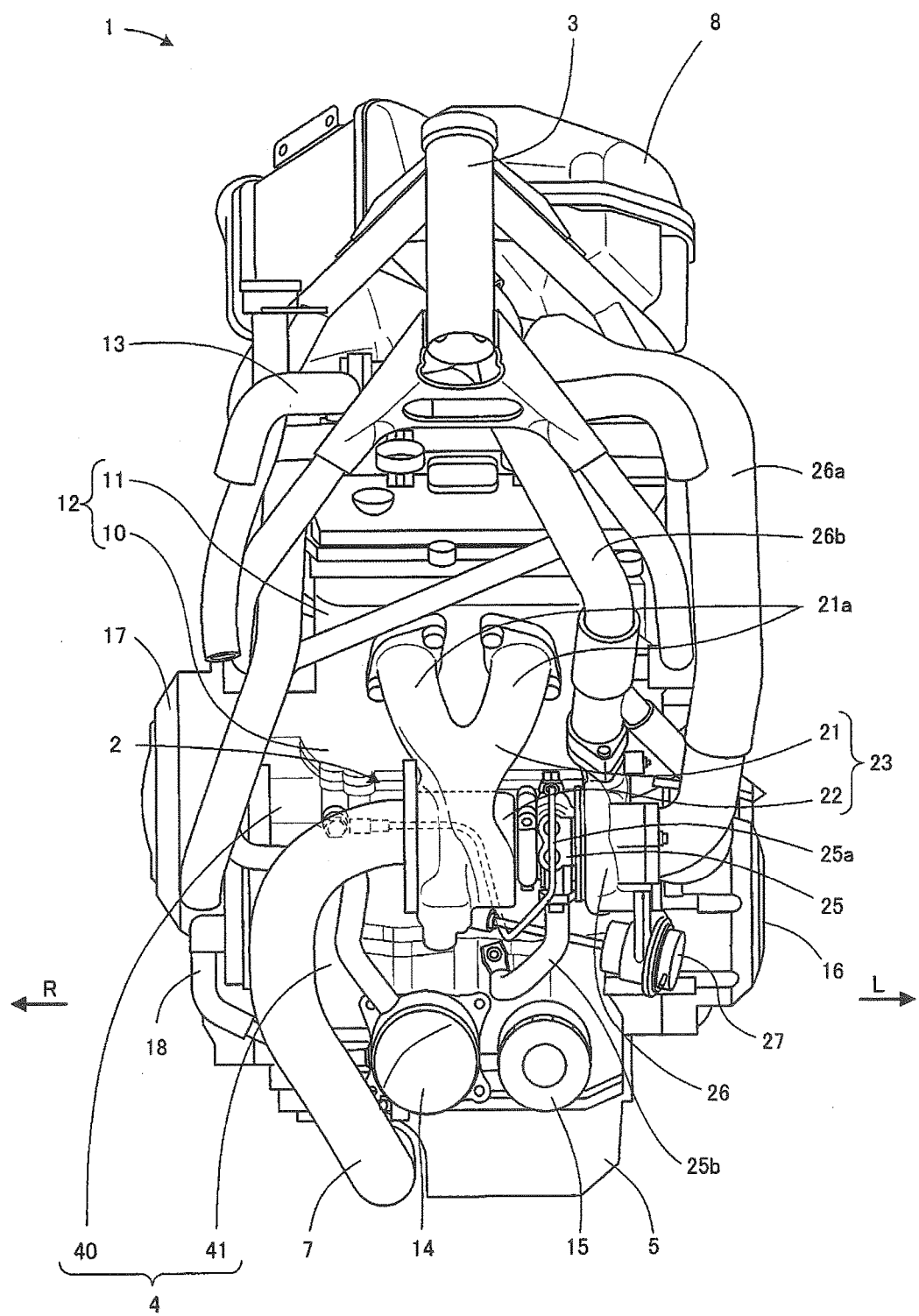
FIG. 2 is a front view around the engine shown in FIG. 1.

A schematic configuration of a motorcycle in accordance with an illustrative embodiment is described with reference to FIGS. 1 and 2. FIG. 1 is a side view depicting a schematic configuration around an engine of a motorcycle in accordance with an illustrative embodiment. FIG. 2 is a front view around the engine shown in FIG. 1.

As shown in FIGS. 1 and 2, the motorcycle in accordance with the illustrative embodiment is a motorcycle having a supercharger 2, so-called turbo charger in which an exhaust air of an engine 1 is used as a driving source. The motorcycle is configured by suspending the engine 1 to a vehicle body frame 3. The engine 1 is a two-cylinder four-cycle engine, and has constitutional components such as pistons and the like accommodated in a cylinder assembly 12 configured by a cylinder block 10 and a cylinder head 11, and a cylinder head cover 13 is attached to an upper end of the cylinder assembly 12 (cylinder head 11). A crank case 4 configured to accommodate therein a crankshaft (not shown) is attached to a rear-lower side of the cylinder assembly 12.

The crank case 4 is configured to be vertically separable and has an upper case 40 and a lower case 41. When the upper case 40 and the lower case 41 are combined, a space for accommodating a variety of shafts in the crank case 4 is formed. A front-upper part of the upper case 40 opens, and the cylinder block 10 is attached to the upper case 40 so as to block the opening. The lower case 41 opens downward, and an oil pan 5 is attached to the lower case 41 so as to block the opening.

Also, an oil cooler 14 configured to cool oil in the engine 1 and an oil filter 15 (which is not shown in FIG. 1) configured to filter unclean oil are attached to a front part of the lower case 41. As shown in FIG. 2, the oil cooler 14 is provided at a right side of the front part of the lower case 41 and the oil filter 15 is provided at a left side.

Also, a balancer 42 (which is not shown in FIG. 2) configured to reduce rotation vibrations of the engine 1 is provided at a front side of the engine 1 in the lower case 41. The balancer 42 has a balancer shaft (not shown) coaxial with a water pump 18 (which will be described later). In the illustrative embodiment, the oil cooler 14 and the oil filter 15 are disposed below the balancer 42, so that it is possible to efficiently utilize a space below the balancer 42.

Both right and lefts sides of the crank case 4 are formed with openings, respectively. A magneto cover 16 (which is not shown in FIG. 1) configured to cover a magneto (not shown) is attached to the left opening, and a clutch cover 17 configured to cover a clutch (not shown) is attached to the right opening.

Also, the engine 1 of the illustrative embodiment is a water-cooling type engine, and the engine 1 is provided with a water pump 18 configured to pump cooling water to the engine 1 and a radiator unit 6 (which is not shown in FIG. 2) configured to cool the cooling water warmed by the engine 1. The water pump 18 is provided in front of the clutch cover 17 on a side surface of the crank case 4. The radiator unit 6 is provided at the front of the engine 1 so as to receive traveling wind of a vehicle, and has a first radiator 60 provided in front of a substantial half upper part of the engine 1 and a second radiator 61 provided in front of a substantial half lower part of the engine 1.

Each of the radiators 60, 61 is configured by disposing a pair of tanks 62, 63 (only one (right) tank is shown) to face each other in a vehicle width direction and coupling a radiator core (not shown) between the pair of tanks 62, 63. The radiator core is configured by alternately stacking a plurality of flat water tubes (not shown) and cooling fins (not shown). Also, the first radiator 60 and the second radiator 61 are disposed side by side in an upper-lower direction, and the tanks 62, 63 of one side are coupled by a pipe 64. In the meantime, a positional relation between the respective radiators 60, 61 and a main body of the engine 1 will be described later.

Also, an electric fan 65 disposed to face the radiator core is provided at the rear of the first radiator 60. The electric fan 65 is configured by attaching a fan, which is formed of a resin material, to a shaft of a motor (not shown). The electric fan 65 is driven, so that it is possible to blow wind to the radiator core. Therefore, it is possible to increase a cooling effect of the cooling water even at a state where the vehicle stops.

A supercharger 2 is disposed close (adjacent) to a front surface of the crank case 4 in a gap between the radiator unit 6 and the engine 1. The supercharger 2 has a housing main body 23 of which an exhaust manifold (hereinafter, referred to as manifold part 21) and a turbine housing (hereinafter, referred to as housing part 22) (which will be described later) are integrally formed by casting. The manifold part 21 is attached to an exhaust port of the engine 1, so that the supercharger 2 is fixed to the engine 1.

The housing part 22 has a cylinder shape of which an axial direction is the vehicle width (right-left) direction, and a turbine 24 (refer to FIG. 3) is accommodated therein. The manifold part 21 is connected to an upper side of the cylindrical surface of the housing part 22. The manifold part 21 has a pair of pipes 21 a branched upward from the connection part to the housing part 22. Tips of the pipes 21 a are connected to two exhaust ports formed at a front side of the cylinder head 11.

An exhaust pipe 7 (muffler) is connected to a right end-side of the housing part 22. A bearing housing 25 configured to accommodate therein bearings (not shown) of a turbo shaft is provided at a left end-side of the housing part 22. Also, a compressor housing 26 configured to accommodate therein a compressor (not shown) is provided at the left of the bearing housing 25.

One end of an oil piping 25a configured to supply oil from the crank case 4 is connected to an upper part of the bearing housing 25, and one end of an oil piping 25b configured to return the oil to the crank case 4 is connected to a lower part of the bearing housing 25. The other end of the oil piping 25a is connected to the upper case 40, and the other end of the oil piping 25b is connected to the lower case 41. The oil in the crank case 4 is supplied to the bearing housing 25, so that the turbo shaft and the bearings are lubricated.

The turbo shaft extends from the housing part 22 in the vehicle width direction between the housing part and the compressor housing 26, and the turbine 24 is fixed to one end (right end) and the compressor is fixed to the other end (left end). Thereby, the turbine 24 and the compressor are configured to be integrally rotatable about the turbo shaft.

A waste gate valve 27 is provided below the compressor housing 26. The waste gate valve 27 is to adjust an inflow amount of the exhaust air to the turbine 24 (housing part 22). For example, when a supercharging pressure rapidly increases, the waste gate valve 27 operates, so that the inflow amount of the exhaust air to the turbine 24 is reduced.

A compressor pipe 26a configured to introduce the air having passed through the air cleaner 8 into the supercharger 2 is connected to a left end of the compressor housing 26. Also, an intake pipe 26b configured to introduce the air compressed in the compressor housing 26 into the engine 1 is connected to an upper part of the compressor housing 26.

In the motorcycle having the supercharger 2 configured as described above, the exhaust air from the engine 1 is introduced into the housing part 22 (turbine housing) via the manifold part 21 (exhaust manifold) and an exterior air is introduced into the compressor housing 26 through the air cleaner 8 and the compressor pipe 26a, in correspondence to a passenger's throttle operation.

In the housing part 22, the turbine 24 rotates at high speed by the exhaust air current, so that the exhaust air is discharged to the outside through the exhaust pipe 7. In the compressor housing 26, the compressor rotates in correspondence to the rotation of the turbine 24, so that the air is compressed. The compressed air is introduced into the engine 1 through the intake pipe 26b.

In this way, the air is compressed by the supercharger 2, so that it is possible to deliver a fuel-air mixture of a total engine displacement or higher of the engine 1 to the engine 1. As a result, it is possible to burn more fuels, thereby increasing an output of the engine 1.

In the meantime, the supercharger (turbo charger) configured to compress the intake air by using the exhaust air of the engine is attached to the engine via the exhaust manifold. The exhaust manifold is manufactured by bending metallic pipes corresponding to the number of the cylinders and welding the respective pipes.

When manufacturing the exhaust manifold by bending the pipes in this way, a space for securing a bending radius of the pipe is required due to an influence of a minimum bending radius of the pipe. Therefore, the supercharger should be attached with being spaced from the engine by a distance corresponding to the space. As a result, it is difficult to dispose the supercharger near the engine.

Also, since the supercharger is configured to compress the intake air by using the exhaust air of the engine, the heat is considerably generated during the driving. Particularly, when the components such as the radiator are provided in front of the engine, it is necessary to sufficiently secure a gap between the supercharger, which is a heat generation component, and the radiator, so that the vehicle is enlarged as a whole in the front-rear direction.

Therefore, in the illustrative embodiment, the exhaust manifold (manifold part 21) and the housing part 22 of the supercharger 2 are integrally formed by the casting, so that the exhaust manifold (housing main body 23) is made smaller, as compared to a configuration where the pipe is bent. Thereby, it is possible to dispose the supercharger 2 near the engine 1 (crank case 4). As a result, it is not necessary to secure a large radius, which is required when bending the pipe, so that it is possible to dispose the supercharger 2 without increasing the width of the engine 1 in the front-rear direction.

That is, in the illustrative embodiment, the supercharger 2 of which the exhaust manifold and the housing are integrally formed is adopted, so that it is possible to arrange a bending point of the manifold part 21 near the engine 1. Thereby, it is possible to dispose the supercharger 2 near the engine 1 and above the balancer 42. Further, since the bending point of the manifold part 21 is made small, a space is secured above the manifold part 21 and the radiator unit 6 (first radiator 60) is disposed in the corresponding space. By these configurations, it is possible to reduce the entire width of the engine 1 in the front-rear direction even though the engine has the radiator unit 6.

Figure 3:
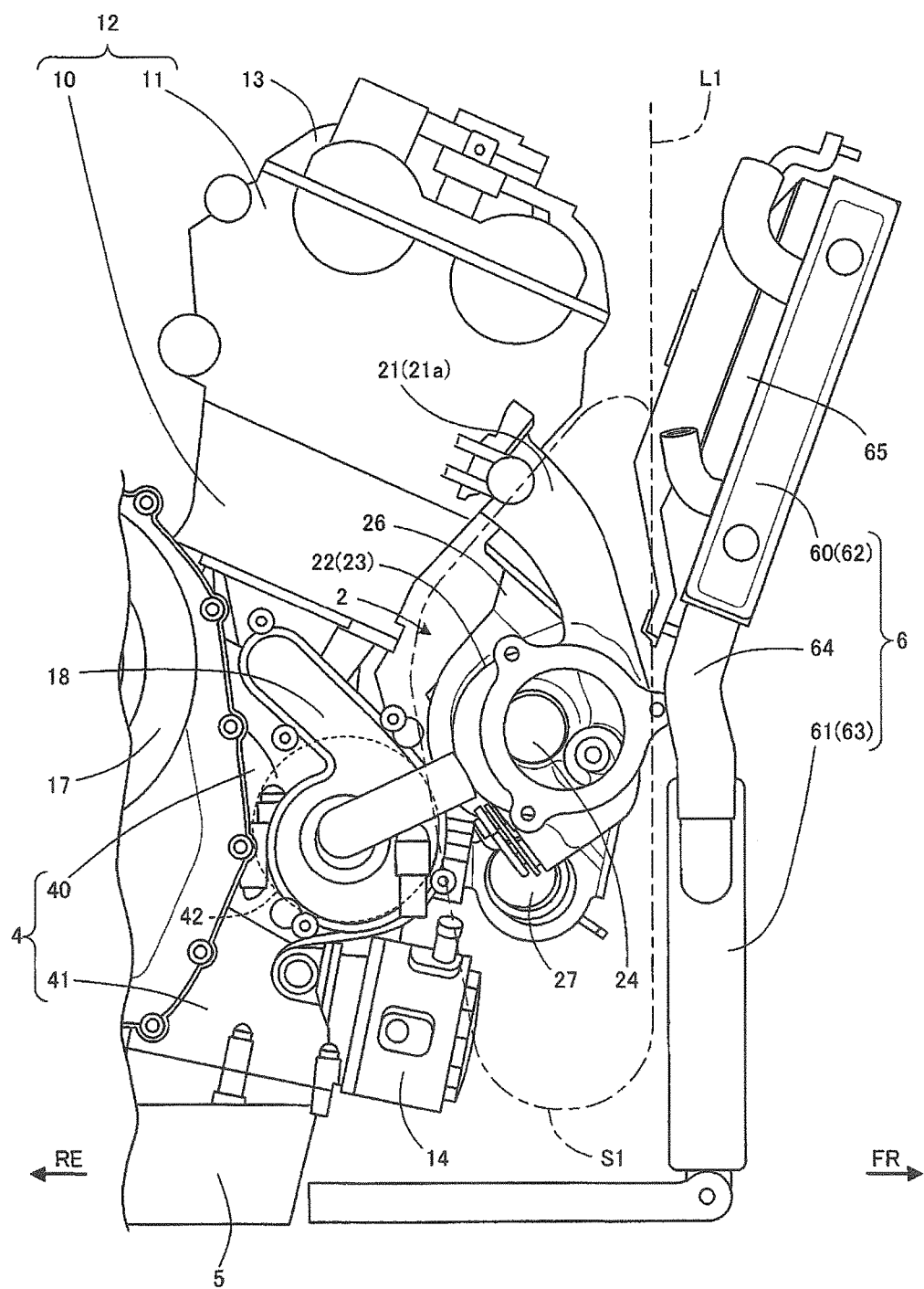
FIG. 3 is a side view depicting a configuration around a supercharger in accordance with the illustrative embodiment.

Subsequently, a layout of surrounding configurations of the supercharger and the engine is described with reference to FIGS. 2 and 3. FIG. 3 is a side view depicting a configuration around the supercharger in accordance with the illustrative embodiment.

As shown in FIGS. 2 and 3, in the illustrative embodiment, the cylinder assembly 12 and the cylinder head cover 13 are inclined forward relative to the crank case 4, and a front end of the cylinder head cover 13 is positioned in front of the front surface of the crank case 4. Also, the radiator unit 6 is disposed with a slight gap forward from the front end of the cylinder head cover 13. The radiator unit 6 is disposed to extend from a lower end of the crank case 4 to a height of the cylinder head cover 13 in the substantially vertical direction.

In this way, a space S1 extending vertically is formed in the gap between the engine 1 and the radiator unit 6, i.e., among the front of the crank case 4, the lower of the cylinder assembly 12 and the radiator unit 6. In the illustrative embodiment, the housing main body 23 (the manifold part 21 and the housing part 22) is integrally formed by the casting, so that the width of the manifold part 21 in the front-rear direction is made as small as possible and the housing part 22 is thus disposed close to the crank case 4. For this reason, it is possible to dispose the supercharger 2 near the crank case 4 in the limited space S1, so that it is possible to reduce the entire width of the engine 1 in the front-rear direction.

Also, the supercharger 2 is disposed above the balancer 42 and below the first radiator 60. The supercharger 2 is disposed between the balancer 42 and the radiator unit 6 (particularly, the first radiator 60), so that it is possible to effectively utilize a space in front of the crank case 4. In particular, the supercharger 2 is disposed above the balancer 42, so that it is possible to secure a height ranging from a ground to the supercharger 2. Therefore, even when foreign matter or water is hoisted by wheels (not shown) during the traveling, it is possible to prevent the foreign matter or water from being directly attached to the supercharger 2. Thereby, it is possible to prevent a situation where when the water or the like is attached to the supercharger 2, the supercharger 2 is rapidly cooled and the constitutional components (diverse housings and the waste gate valve 27) of the supercharger 2 is thus deformed because the supercharger 2 is a heat generation component, as described above. Also, the height ranging from the ground to the supercharger 2 is secured, so that the supercharger 2 is difficult to be submerged into the water and anti-submergence of the supercharger 2 is improved.

Also, the supercharger 2 is disposed above the balancer 42 (lower case 41), so that it is possible to use an own weight of the oil when returning the oil supplied to the bearing housing 25 to the lower case 41. For this reason, it is not necessary to separately provide a dedicated oil pump so as to return the oil to the crank case 4, so that it is possible to simplify the configuration.

Also, the electric fan 65 is disposed above the manifold part 21, so that the electric fan 65 can be disposed with being spaced from the manifold part 21. The manifold part 21 is a heat generation part. However, as described above, the electric fan 65 has the fan formed of the resin material. Therefore, the gap is secured between the manifold part 21 and the electric fan 65, so that it is possible to suppress a direct influence of heat from the supercharger 2 on the electric fan 65.

Also, the first radiator 60 is disposed above the manifold part 21 and below the cylinder head cover 13. More specifically, a lower end of the first radiator 60 is located at a higher position than a lower end of the manifold part 21 (the connection part between the manifold part 21 and the housing part 22), and an upper end of the first radiator 60 is located at a lower position than an upper end of the cylinder head cover 13. For this reason, it is possible to dispose the first radiator 60 in a limited space between the manifold part 21 and the cylinder head cover 13, so that it is possible to effectively utilize the space. In particular, it is possible to dispose the radiator unit 6 without increasing an entire height of the engine 1.

Also, regarding the housing main body 23, the manifold part 21 is connected above the housing part 22. For this reason, it is not necessary to extend the manifold part 21 downward, and it is possible to secure a space below the housing part 22. As a result, the oil cooler 14 and the oil filter 15 are disposed in the empty space, so that the space is effectively utilized.

Further, the manifold part 21 (the pair of pipes 21a) is positioned at the rear of a front surface (a dashed-two dotted line L1 in FIG. 3) of the housing part 22. In the illustrative embodiment, since the housing main body 23 is integrally formed by the casting, it is possible to shorten the lengths of the pipes 21 a, as compared to a configuration where the pipes are bent. Therefore, it is possible to reduce a protrusion amount of the manifold part 21 in the front-rear direction. Also, the housing part 22 is provided below the manifold part 21, so that it is possible to bring the entire supercharger 2 close to the crank case 4-side. For this reason, it is possible to reduce the entire width of the engine 1 in the front-rear direction.

As described above, according to the illustrative embodiment, the exhaust manifold (manifold part 21) and the turbine housing (housing part 22) are integrally formed by the casting, so that it is possible to design the shape of the exhaust manifold (housing main body 23) smaller, as compared to a configuration where the pipes are bent. For this reason, it is possible to dispose the supercharger 2 near the engine 1. Also, as the shape of the exhaust manifold is made smaller, it is possible to dispose the radiator unit 6 (first radiator 60) near the engine 1-side above the supercharger 2. By these configurations, it is possible to reduce the entire width of the engine 1 in the front-rear direction even though the engine has the radiator unit 6. In this way, since it is possible to secure a degree of freedom as to the shape of the housing main body 23, it is possible to dispose the supercharger 2 without enlarging the engine 1, as compared to a configuration where the exhaust manifold and the turbine housing are separately formed. Also, the number of components is reduced, so that it is possible to simply perform a mounting operation.

In the meantime, the disclosure is not limited to the illustrative embodiment and can be diversely changed and implemented. In the illustrative embodiment, the sizes, shapes and the like shown in the accompanying drawings are not limited thereto and can be appropriately changed within a scope of achieving the effects of the disclosure. In addition, the illustrative embodiment can be appropriately changed without departing from the object of the disclosure.

For example, in the above illustrative embodiment, the two-cylinder engine 1 has been described. However, the disclosure is not limited thereto. For example, the engine 1 may be a single cylinder engine or a three or more-cylinder engine.

Also, in the above illustrative embodiment, the water-cooling type engine 1 has been described. However, the disclosure is not limited thereto. For example, the engine 1 may be an air-cooling type engine or may be an engine having an air-cooling type oil cooler.

Also, in the above illustrative embodiment, both the oil cooler 14 and the oil filter 15 are provided below the balancer 42. However, the disclosure is not limited thereto. For example, any one of the oil cooler 14 and the oil filter 15 may be provided.

As described above, the disclosure has the effect of disposing the supercharger without enlarging the engine, and is particularly useful for the engine having the supercharger and the motorcycle.

What is claimed is:
1. An engine comprising:
an exhaust manifold attached to an exhaust port of a cylinder head;
a supercharger having a turbine housing accommodating therein a turbine configured to rotate by an exhaust air from the exhaust port;
a balancer disposed at a front side in a crank case; and
a radiator disposed in front of the engine,
wherein the exhaust manifold and the turbine housing are integrally formed,
wherein the supercharger is disposed above the balancer, and
wherein the radiator is disposed above the supercharger.
2. The engine according to claim 1,
wherein the radiator is attached with an electric fan, and
wherein the electric fan is disposed above the exhaust manifold.
3. The engine according to claim 1, wherein the radiator is disposed above the exhaust manifold and below a cylinder head cover.
4. The engine according to claim 1, wherein an oil cooler and/or an oil filter is disposed below the balancer.
5. The engine according to claim 1, wherein the exhaust manifold is connected above the turbine housing.
6. The engine according to claim 1, wherein the exhaust manifold is positioned at the rear of a front surface of the turbine housing.
7. A motorcycle comprising the engine according to claim 1.

* * * * *